(12) United States Patent
Mochizuki

(10) Patent No.: US 6,592,261 B2
(45) Date of Patent: Jul. 15, 2003

(54) MOTION GUIDE DEVICE

(75) Inventor: Hiroaki Mochizuki, Tokyo-to (JP)

(73) Assignee: THK Co., Ltd., Tokyo-ku (JP)

( * ) Notice: Subject to any disclaimer, the term of this patent is extended or adjusted under 35 U.S.C. 154(b) by 24 days.

(21) Appl. No.: 09/781,991

(22) Filed: Feb. 14, 2001

(65) Prior Publication Data

US 2001/0016089 A1 Aug. 23, 2001

(30) Foreign Application Priority Data

Feb. 18, 2000 (JP) ......................................... 2000-046756

(51) Int. Cl.[7] .............................................. F16C 29/06
(52) U.S. Cl. ............................................ 384/45; 384/15
(58) Field of Search ............................. 384/45, 15, 49, 384/50, 55, 44

(56) References Cited

U.S. PATENT DOCUMENTS

| 3,785,418 | A | * | 1/1974 | Hennig et al. | 384/15 |
| 3,845,993 | A | * | 11/1974 | Schiler | 384/45 |
| 4,432,587 | A | * | 2/1984 | Bryan | 384/45 |
| 5,518,317 | A | * | 5/1996 | Osawa | 384/45 |
| 5,556,206 | A | * | 9/1996 | Bigwood | 384/15 |
| 5,575,566 | A | * | 11/1996 | Faulhaber | 384/15 |

FOREIGN PATENT DOCUMENTS

| DE | 18 25 192 | 1/1961 |
| EP | 0 731 283 A1 | 9/1996 |
| JP | 2719985 | 2/1998 |

OTHER PUBLICATIONS

"Locking Method For Raceway" IBM Technical Disclosure Bulletin, IBM Corp, New York, U.S, vol. 39, No.1, 1996, pp. 257–258.

* cited by examiner

Primary Examiner—Christopher P. Schwartz
Assistant Examiner—Melanie Torres
(74) Attorney, Agent, or Firm—Armstrong, Westerman, & Hattori, LLP

(57) ABSTRACT

A motion guide device generally includes a track member having a horizontal surface and two side surfaces continuous to the horizontal surface, a movable member mounted to the track member to be relatively movable with respect to the track member to be relatively movable with respect to the track member along a longitudinal direction thereof, and a cover member covering the horizontal surface of the track member along an entire width direction thereof. The track member is formed with undercut portions formed to side edge portions of the side surfaces of the track member on the horizontal surface sides, and the undercut portions are recessed towards a central side of the track member in the width direction thereof. The cover member includes a central flat portion and engaging portions formed at both end portions in the width direction thereof to be engaged with the undercut portions, respectively, so as to clamp the track member therebetween in the width direction.

8 Claims, 5 Drawing Sheets

MOTION GUIDE DEVICE

The present application claims priority under 35 U.S.C § 119 to Japanese Patent Application No.2000-46756, filed Feb. 18, 2000 entitled "MOTION GUIDE DEVICE" The contents of that application are incorporated herein by reference in their entirety.

BACKGROUND OF THE INVENTION

The present invention relates to a motion guide device for guiding a movable member along a predetermined track member, and more particularly, to a motion guide device capable of covering an opening for attachment formed on an upper surface of the track member by a cover covering an entire area in a width direction of the upper surface thereof.

As a device for guiding a movable member such as table of a machine tool in a predetermined direction, there is known a motion guide device constituted by mounting a movable member to a track member by means of a number of rolling members. In such device, the track member or movable member is fixed to a stationary portion of a machine, or the movable member or track member is fixed to a movable portion of the machine. The track member is formed with a plurality of bolt mounting holes for fixing the same so as to penetrate vertically the track member. However, according to a use of such guide device, there is a case where foreign bodies invade in the bolt-mounting hole and is bitten by a seal of the movable member, thus causing a trouble.

In order to solve such trouble or problem, there has been proposed a device in which a track member is entirely covered by a cover to also cover the bolt mounting holes. FIG. 5 (FIGS. 5A and 5B) shows a cover mounting structure, as one example of such device, in a motion guide device disclosed in the Japanese Patent Publication No. 2719985. In a device 1 shown in FIG. 5, a cover 3 is disposed for covering a track member 2 at an entire area in the width direction (lateral direction as viewed) of an upper surface 2a of the track member 2, undercut portions 4 are formed to both side surface portions 2a of the track member 2 at portions continuous to the upper surface 2a of the track member 2 through a round corner portions, and engaging portions 3a are formed to both the edge portions of the cover 3 to be tightly contacted to contact surfaces 4a of the undercut portions 4.

Furthermore, in the structure shown in FIG. 5, an angle α constituted by a central portion 3b of the cover 3 and the engaging portion 3a thereof is set to be smaller than an angle β constituted by the contact surface 4a of the undercut portion 4 and the upper surface 2a of the track member 2. Accordingly, at a time when the cover 3 is applied to the track member 2, if the cover 3 is forcibly pushed to the track member 2 such that the central portion 3b of the cover 3 is contacted to the upper surface 2a of the track member 2 with the engaging portion 3a of the cover 3 being engaged with the contact surface 4a of the undercut 4, the engaging portion 3a of the cover is elastically deformed so as to be opened outward, and hence, the engaging portion 3a is closely contacted to the contact surface 4a of the undercut 4 by its elastic restoring force, thus firmly holding the cover 3 on the track member 2. Further, it is noted that, in FIG. 5, although only one end side in the width direction of the track member 2 is shown, the other one end side thereof is also formed symmetrically with the mentioned one end side.

In the structure mentioned above, the engaging portion 3a gets into most inward, at its front (lower) end portion, in the width direction of the track member 2, and therefore, it is impossible to engage both the lateral pair of engaging portions 3a at the same time with the undercut portions 4.

Accordingly, the cover 3 is mounted to the track member 2 in the following manner.

First, as shown in FIG. 5B, the cover 3 is inclined (tilted) from the horizontal surface so that one engaging piece 3a is engaged with a corresponding one undercut portion 4. Under this state, the cover 3 is pulled towards the opposite side engaging portion 3a as shown with an arrow A and forcibly fitted to the upper surface of the track member 2 to thereby engage the opposite side engaging portion 3a with a corresponding undercut portion 4.

In such mounting structure, although the come-off of the cover 3 may be surely prevented, it is required to largely elastically deform the one side engaging portion 3a at the mounting time, and accordingly, this engaging portion 3a may be plastically deformed in a case when this mounting working is not well performed. Furthermore, when the cover 3 is removed, there is a case where the engaging portion 3a of the cover 3 tightly contacts the contacting surface 4a of the undercut portion 4 and the cover 3 is hence not easily peeled therefrom. In such case, it is obliged to gradually peel off (remove) the engaging portion 3a from both the longitudinal end portions of the track member 2, which requires much working time and labor for a worker, and moreover, at a time of peeling off the engaging portion 3a, there may cause an unnatural twisting force which may plastically deform the engaging portion 3a.

SUMMARY OF THE INVENTION

An object of the present invention is to substantially eliminate defects or drawbacks encountered in the prior art mentioned above and to provide a motion guide device capable of easily mounting or dismounting (removing) a cover covering an upper surface of a track member without giving any damage to the cover during the mounting (dismounting) working time.

This and other objects can be achieved according to the present invention by providing a motion guide device comprising:

a track member having an upper surface and two side surfaces continuous to the upper surface;

a movable member mounted to the track member to be relatively movable with respect to the track member along a longitudinal direction thereof; and a cover member covering the upper surface of the track member across an entire width direction thereof, the track member being formed with undercut portions formed to side edge portions of the side surfaces of the track member on the upper surface side thereof, the undercuts being recessed towards a central side of the track member in the width direction thereof and the cover member comprising a central flat portion and engaging portions formed at both end portions in the width direction thereof to be engaged with the undercut portions, respectively, so as to clamp the track member therebetween in the width direction, each of the engaging portions comprising an intermediate section to be engaged with the undercut portion of the track member and a front end section bent outward from the intermediate section so as to be opened outward in the width direction of the track member.

In the above aspect, it is to be noted that the term "upper" surface of the track member means a surface opposite to a lower surface in a case of providing that a mounting (mount) surface of the track member with respect to an object member is considered to be "lower" surface. Therefore, it is not absolute for this surface to direct the "upper" direction in an actual use, and in claims of the subject application, this term of "upper" surface is referred to as "horizontal" surface with reference to two side surfaces of the track member.

Furthermore, the movable member is mentioned as a member to be relatively movable with respect to the track member, and the motion guide device of the present invention is not limited to the structure in which the movable member is itself moved in use.

In a preferred embodiment of the aspect mentioned above, an outline of the intermediate section and the front end section is curved in a circular shape towards the central side of the track member in the width direction thereof. The engaging portion of the cover member has an elasticity so that both the engaging portions are simultaneously engaged with the undercut portions of the track member. That is, the cover member is formed of a plate member having an elasticity so that the central portion of the cover member is engaged with the upper surface of the track member and both the engaging portions of the cover member are simultaneously engaged with the undercut portions of the track member by depressing the flat portion of the cover member to the upper surface of the track member.

The cover member has a longitudinal dimension substantially equal to that of the track member.

The upper surface and the side surfaces of the track member are continuous to each other through round portions and each of the engaging portions of the cover member further comprises a base section curved outward from the intermediate section so as to coincide in shape with the round portion of the track member.

The track member is formed with openings to the upper surface thereof.

According to the present invention of the structures mentioned above, the front end sections of the engaging portions of the cover member are opened outward from the intermediate portions thereof, so that, by placing the engaging portions to the end edges of the upper surface of the track member and then pushing the cover member towards the upper surface of the track member, the engaging portions are elastically deformed outward and slid over the continuous round portion connecting the upper surface of the track member and the side surfaces thereof and the intermediate sections of the engaging portions are engaged with the recessed undercut portions of the track member. On the other hand, when the cover member is removed from the track member, the outward opened front end sections of the engaging portions are grasped and pulled upward, thus being easily removed. Since such working can be done without applying a large force locally, the cover member cannot be deformed.

The circularly curved shape of the intermediate section and the front end sections of the engaging portions can allow the engaging portions to be easily elastically deformed at the time of being attached to or removed from the track member and the working efficiency can be improved. The deformation of the cover member can be also prevented.

The cover member can be easily fitted to the track member by simultaneously fitting the engaging portions to the undercut portions of the track member.

The nature and further characteristic features of the present invention will be made more clear from the following descriptions made with reference the accompanying drawings.

BRIEF DESCRIPTION OF THE DRAWINGS

In the accompanying drawings:

FIG. 5 includes views for showing mounting processes of the cover of the motion rolling guide device in a prior art in which

DESCRIPTION OF THE PREFERRED EMBODIMENT

FIGS. 1 to 4 represent one preferred embodiment of the present invention.

Figure 1:
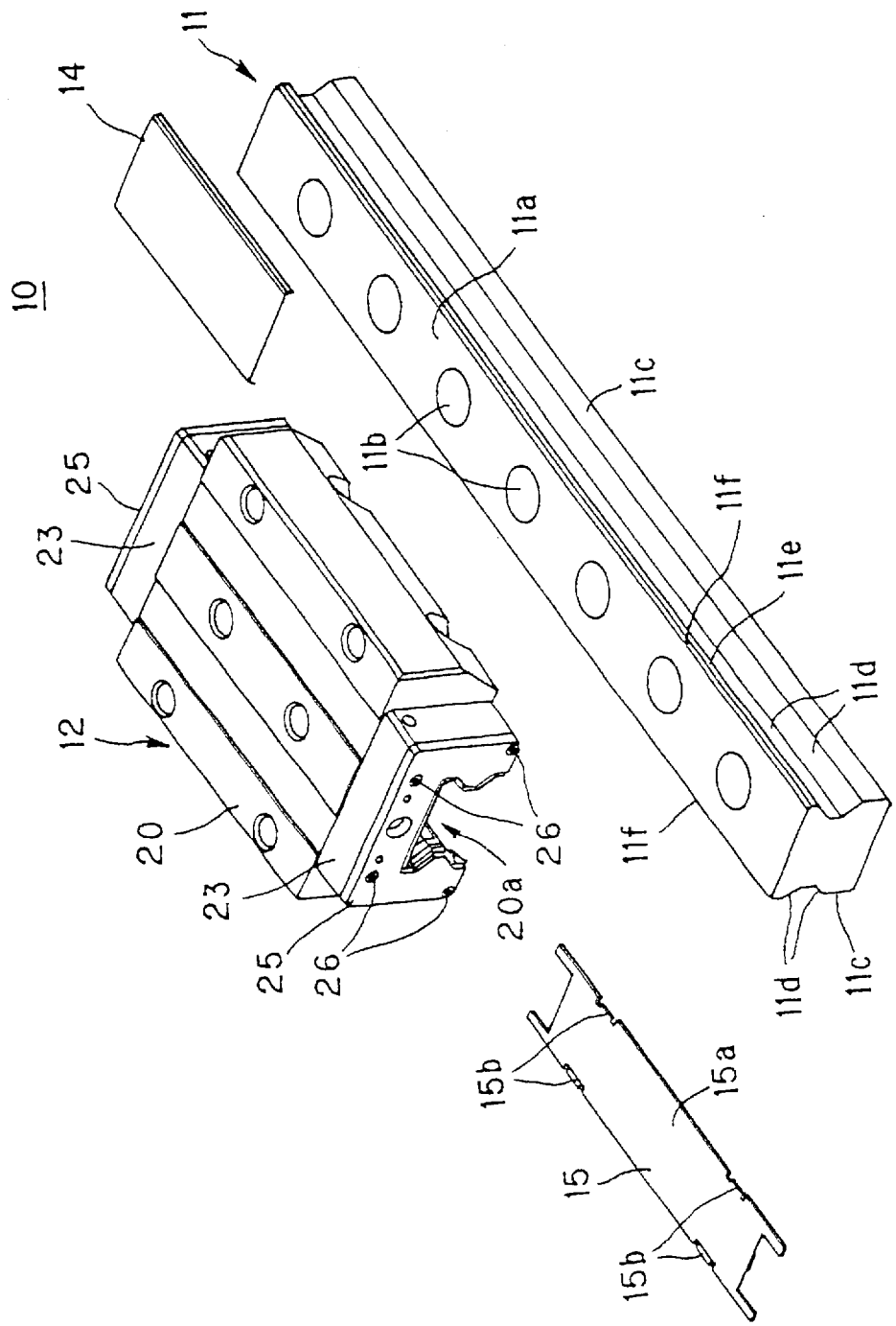
FIG. 1 is a developed perspective view showing an entire structure of the motion rolling guide device according to the one embodiment of the present invention.

First, with reference to FIG. 1, a motion rolling guide device 10 of the present invention will be described. The motion rolling guide device comprises a track member 11, a movable member 12 mounted to the track member 11 to be relatively movable in a longitudinal direction of the track member 11, a plate cover (cover plate) 14 covering an upper surface of the track member 11 and an inner seal 15 disposed between the movable member 12 and the plate cover 14. The movable member 12 is mounted to the track member 11 with a number of rollers as rolling members, not shown, being interposed therebetween. In the illustration of FIG. 1, although the plate cover 14 has a length shorter than that of the track member 11 in the longitudinal direction thereof, in an actual structure, the plate cover 14 has substantially the same longitudinal length as that of the track member 11.

The track member 11 is formed of a material having a high rigidity such as steel, and a number of bolt mounting holes 11b, 11b, - - - , 11b are formed to the upper surface 11a of the track member 11 so as to vertically penetrate it for mounting or attaching the track member 11 to a machine part, machine tool or the like. Two rows of roller rolling surfaces, i.e. raceways, along which the rollers travel, are formed to each of side surfaces 11c, 11c of the track member 11.

The movable member 12 comprises a block body 20, a pair of end plates 23, 23 attached to both longitudinal end portions of the block body 20 and end seals 25, 25 mounted to outer surfaces of the end plates 23, 23 by means of screws 26, 26, - - - , 26.

The block body 20 is formed, as like as the track member 11, of a material having a high rigidity such as steel and has a lower surface (in an illustrated state) to which a recessed portion 20a is formed so as to receive the track member 11. The recessed portion 20a has an inner wall section to which lateral two roller rolling surfaces, not shown, are formed respectively so as to oppose to the rolling surfaces 11d of the track member 11, and loaded rolling passages for the rollers are formed along these rolling surfaces. Inside the block body 20, a return passage for returning the rollers from one end portion of the loaded rolling passage to the other end portion thereof, and rolling direction changing passages are formed inside the end plates, respectively, so that each connects the return passage and the loaded rolling passage. Accordingly, an endless circulation passage is composed of a pair of loaded rolling passages, the return passage and a pair of rolling direction changing passages connecting the loaded rolling passages and the return passage, and two such endless circulation passages are formed to each of the lateral side portions of the track member 11, that is, four endless circulation passages are formed in total.

The inner seal 15 in shape of plate, as shown in FIG. 1, is composed of a base member 15a formed of a steel plate, for example, lips, not shown, formed to a lower surface thereof and lips 15b, 15b, - - - , 15b for buffer function formed to an upper surface thereof. In an assembling process, both end portions of the inner seal 15 are inserted into recessed portions, not shown, formed to inner surfaces of the end plates 23 and held between both the end plates 23, 23 in the longitudinal direction of the track member 11 so as to prevent the inner seal 15 from coming off in its longitudinal direction. Further, each of the recessed portions formed to the end plates 23, 23 has a vertical thickness (direction normal to the upper surface 11a of the track member 11) larger than a thickness of the end portion of the inner seal plate 15 so that the inner seal plate 15 is idly movable in the vertical direction between the end plates 23, 23. The lips formed to the lower surface of the inner seal 15 contact the plate cover 14 to thereby prevent foreign bodies from entering into the loaded rolling passage and prevent lubricant such as grease from leaking from the loaded rolling passage.

The structure and the mounting manner of the cover plate 14 will be explained hereunder with reference to FIGS. 1 to 3.

Figure 2:
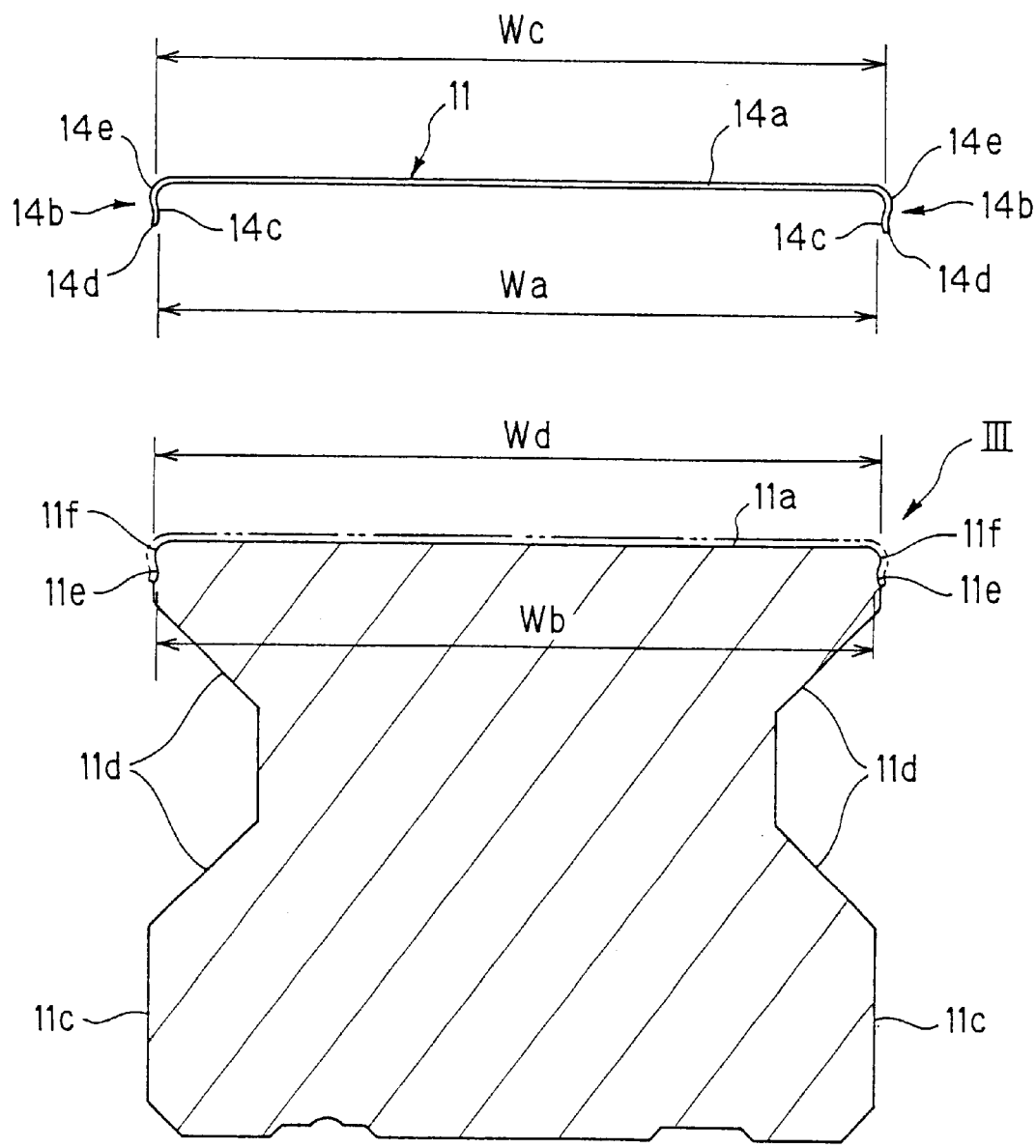
FIG. 2 is a cross sectional view of a track shaft member of a motion rolling guide device according to one embodiment of the present invention.

With reference to FIG. 2 as a sectional view, undercuts 11e, 11e are formed to side edge portions (upper end portions) of both the side surfaces 11c, 11c of the track member 11 so as to be recessed in a width direction of the track member 11. The plate cover 14 has a width approximately the same as the upper surface 11a of the track member 11 and has a flat central surface 14a in its width direction. The plate cover 14 also has both end portions to which engaging portions 14b, 14b are engaged with the undercuts 11e, 11e so as to embrace the track member 11 in the width direction thereof.

Figure 3:
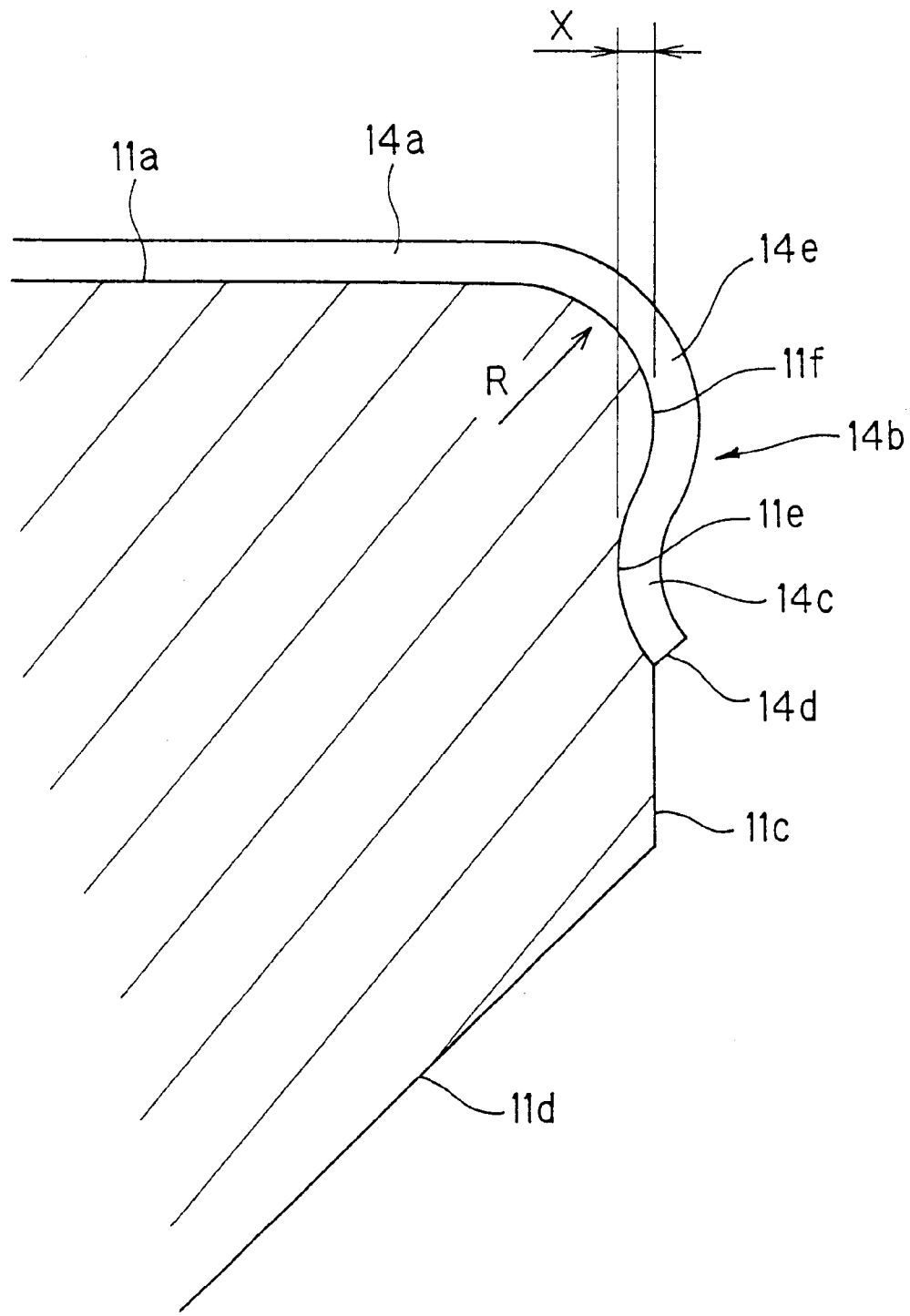
FIG. 3 is a partial enlarged view of a portion III in FIG. 2.

As shown in FIG. 3, in an enlarged scale, a connecting portion between the upper surface 11a of the track member 11 and the side surface 11c thereof is formed as a curved portion 11f (i.e. round portion having a radius of curvature R) so as to describe a circular curve bulged outward, and accordingly, the undercut 11e is formed so as to be hollowed out like a groove towards the central side in the width direction of the track member 11 from the lower end portion of the curved portion 11f. The undercuts 11e and the curved portions 11f are symmetrically formed at both the end portions in the width direction of the track member 11 so as to extend along the entire longitudinal direction thereof.

As best shown in FIG. 3 as a cross sectional view of the track member 11, the engaging portion 14b of the plate cover 14 comprises an intermediate (central) section 14c curved inside towards the central portion in the width direction of the track member 11 so as to be coincident with the recessed shape of the undercut 11e, a front end section 14d curved outward from the intermediate section 14c so as to be opened outward and a base section 14e curved outward from the intermediate section 14c so as to provide a shape coincident with the curved round portion 11f of the track member 11. The flat upper surface 11a is continuous to the undercuts 11e through round portions 11f to which the base sections 14e of the engaging portions 14b are tightly contacted. And an outline of the intermediate section 14c and the front end section 14d is curved in a circular shape towards the central side of the track member 11 in the width direction thereof.

According to the structure mentioned above, the front end section 14d of the engaging portion 14b of the plate cover 14 is opened outward from the intermediate section 14c in the width direction of the track member 11. Therefore, the plate cover 14 is fitted and secured to the track member 11 by abutting the respective engaging portions 14b against the respective curved portions 11f and pushing down the plate cover 14 under the mentioned state directly towards the upper surface 11a of the track member 11 so that the lateral paired engaging portions 14b, 14b are elastically deformed and the intermediate sections 14c, 14c of the engaging portions 14b, 14b are both simultaneously engaged with the undercuts 11e, 11e over the curved portions 11f, 11f, and the plate cover 14 is thereby secured to the track member 11. On the other hand, when the plate cover 14 is removed from the track member 11, the plate cover 14 will be moved upward by engaging any means with the projected (outward opened) front end sections 14d, 14d of the plate cover 14 and forcibly pulling up the plate cover 14 to thereby remove the engaging portions 14b, 14b at the same time from the undercuts 11e, 11e, that is, the plate cover 14 can be removed from the track member 11.

With reference to FIG. 3, the character "X" denotes an amount to be removed from the curved portion 11f of the undercut 11e, and the value of this amount is set to be within a range in which an internal stress exceeding an elastical limit of the plate cover 14 is never caused at a time when the engaging portions 14b are removed over the curved portions 11f. For example, in one embodiment in which the track member 11 has a width of 45 mm, the value X will be set to be about 0.25 mm.

Further, the radius of curvature R of the curved portion 11f is set to be more than 1 mm, for example, so that the curved portion 11f surely remains even if a working error is caused. Furthermore, although the undercuts 11e, 11e can be formed by various working methods or processes, a grinding working may be most preferred in viewpoint of working performance.

With reference to FIG. 2, the width Wa between the inside surfaces of the bilateral intermediate sections 14c, 14c of the engaging portions 14b, 14b of the plate cover 14 and the width Wb between the undercuts 11e, 11e of the track member 11 are set such that the intermediate sections 14c, 14c of the engaging portions 14b, 14b tighten or clamp the track member 11 in the width direction of the track member with a suitable force at the time when the plate cover 14 is fitted to the track member 11. Furthermore, it is desired that the width Wc between the base sections 14e, 14e of the engaging portions 14b, 14b of the plate cover 14 is set to be larger than the width Wd between the inside surfaces of the curved portions 11f, 11f of the track member 11 so as not to adversely affect on the clamping force of the plate cover 14 to the track member 11. However, the difference between these widths Wc and Wd will also have to be set to be slight. The radius of curvature of the base section 14e will have to be set to be smaller than that of the curved portion 11f.

Figure 4A:
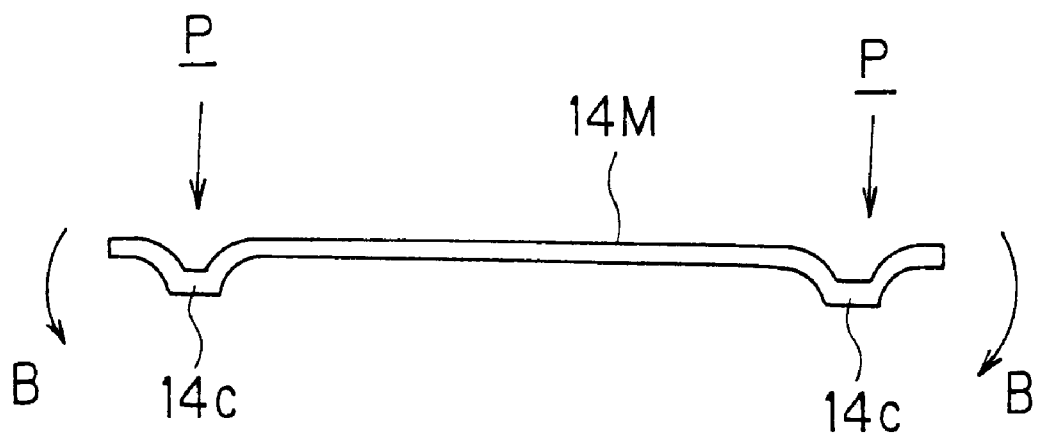
FIG. 4 includes views of FIGS. 4A and 4B showing one example of a cover forming process for the motion rolling guide device.
Figure 4B:
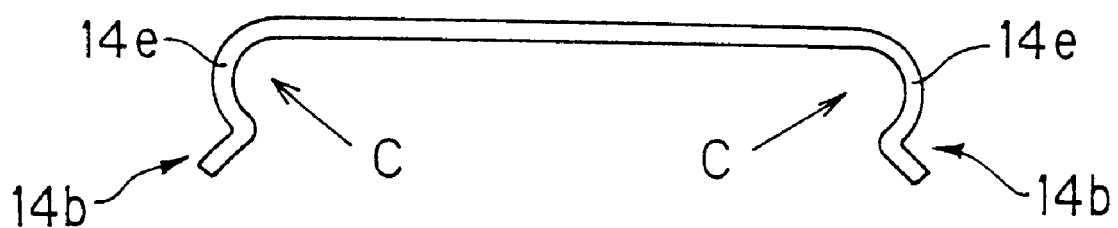
Figure 5A:
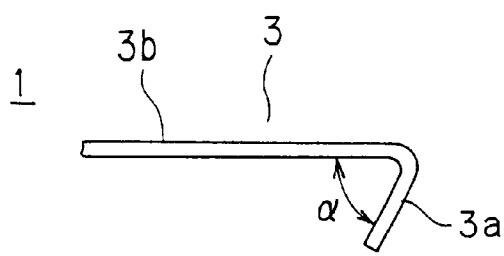
FIG. 5A is a view showing a cover before the mounting to a track shaft (member) of the motion rolling guide device and FIG. 5B is a view showing the cover which is mounting to the track shaft.
Figure 5A:
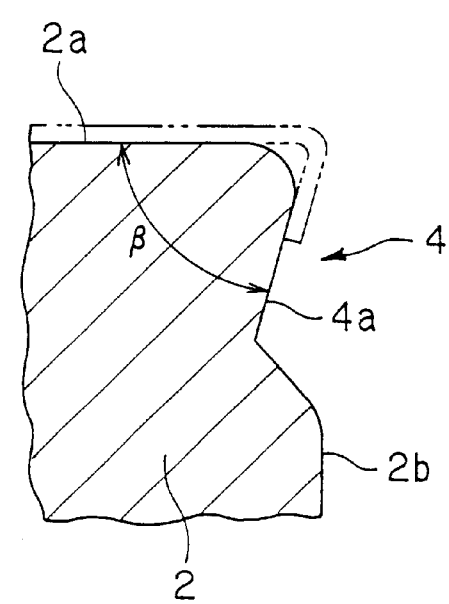
Figure 5B:
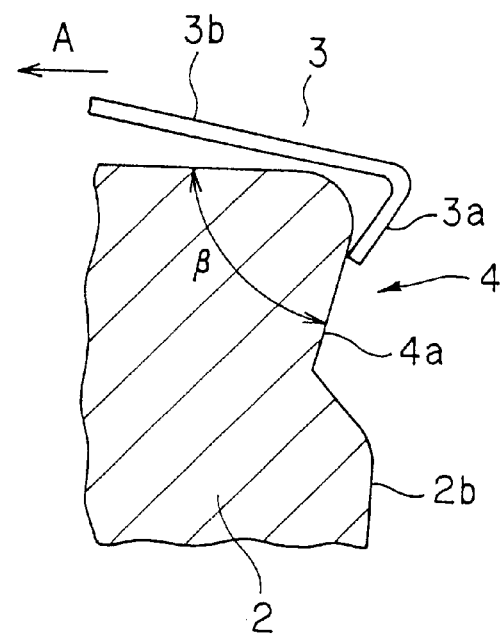

FIGS. 4A and 4B represent one example for forming the plate cover 14. According to this example, in the step of FIG. 4A, both end portions of a flat steel plate 14M as a material of the plate cover 14 are subjected to press working as shown by arrows P so as to form intermediate sections 14c, 14c of the engaging portions 14b, 14b. Both the end portions of such steel plate 14M are then bent as shown by arrows B to thereby form the engaging portions 14b, 14b as shown in FIG. 4B. In this process, a mold is placed to portions (shown with arrows C), which form the base sections 14e, 14e of the engaging portions 14b, 14b, so as to work these portions to provide the radius of curvature of the base section and the widths Wa, Wc with desired or predetermined performance. The plate cover 14 may be formed by a roll forming method in place of the manufacturing method mentioned above, and other many working methods or processes may be adopted as far as the excellent working precision can be attained.

Further, it is to be noted that the present invention is not limited to the described embodiment and many other changes and modifications may be made without departing from the scopes of the appended claims.

For example, the plate cover 14 may be formed from a material other than a metal material as far as the material has an elasticity capable of being repeatedly mounted to and dismounted from the track member 11 and has a friction withstanding property against the inner seal 15. Balls may be utilized in place of the rollers as rolling members. Moreover, the present invention may be applicable to a slide guide device provided with no rolling member. Furthermore, the openings formed to the upper surface of the track member include various openings such as holes, grooves, recesses, etc. formed for various purposes other than the bolt fastening holes in the described embodiment.

What is claimed is:

1. A motion guide device comprising:
   a track member having a horizontal surface and two side surfaces continuous to the horizontal surface;
   a movable member mounted to the track member to be relatively movable with respect to the track member along a longitudinal direction thereof; and
   a cover member covering the horizontal surface of the track member along an entire width direction thereof and secured to said track member;
   said track member being formed with undercut portions formed to side edge portions of the side surfaces of the track member, said undercut portions being recessed towards a central side of the track member in the width direction thereof; and
   said cover member comprising a central flat portion and engaging portions formed at both end portions in the width direction thereof to be engaged with the undercut portions, respectively, so as to clamp the track member therebetween in the width direction, each of said engaging portions comprising an intermediate section to be engaged with the undercut portion of the track member and a front end section bent outward from the intermediate section so as to be opened outward in the width direction of the track member;
   wherein the horizontal surface and the side surfaces of said track member are continuous to each other through round portions and each of said engaging portions of the cover member further comprises a base section curved outward from the intermediate section so as to coincide in shape with the round portion of the track member;
   wherein a width Wa between inside surfaces of bilateral intermediate sections of the engaging portions of the plate cover and a width Wb between the undercut portions of the track member are set such that the intermediate sections of the engaging portions tighten or clamp the track member in the width direction of the track member when the plate cover is fitted to the track member; and
   wherein a width Wc between the base sections of the engaging portions of the plate cover is set to be larger than a width Wd between outside surfaces of the round portions of the track member so as not to adversely affect on the clamping force of the plate cover to the track member.

2. A motion guide device according to claim 1, wherein an outline of said intermediate section and said front end section is curved in a circular shape towards the central side of the track member in the width direction thereof.

3. A motion guide device according to claim 1, wherein said engaging portions of the cover member have an elasticity so that both the engaging portions are simultaneously engaged with the undercut portions of the track member.

4. A motion guide device according to claim 3, wherein said cover member is formed of a plate member having an elasticity so that the central portion of the cover member is engaged with the horizontal surface of the track member and both the engaging portions of the cover member are simultaneously engaged with the undercut portions of the track member.

5. A motion guide device according to claim 1, wherein said cover member has a longitudinal dimension substantially equal to that of the track member.

6. A motion guide device according to claim 1, wherein said track member is formed with openings to the horizontal surface thereof.

7. A motion guide device comprising:
   a track member having a horizontal surface and two side surfaces continuous to the horizontal surface;
   a movable member mounted to the track member to be relatively movable with respect to the track member along a longitudinal direction thereof; and
   a cover member covering the horizontal surface of the track member along an entire width direction thereof,
   said track member being formed with undercut portions formed to side edge portions of the side surfaces of the track member, said undercut portions being recessed towards a central side of the track member in the width direction thereof; and
   said cover member comprising a central flat portion and engaging portions formed at both end portions in the width direction thereof to be engbaged with the undercut portions, respectively, so as to clamp the track member therebetween in the width direction, each of said engaging portions comprising an intermediate section to be engaged with the undercut portion of the track member and a front end section bent outward from the intermediate section so as to be opened outward in the width direction of the track member.
   wherein an outline of said intermediate section and said front end section is curved in a circular shape towards the central side of the track member in the width direction thereof;
   wherein the horizontal surface and the side track member are continuous to each other through round portions and each of said engaging portions of the cover member further comprises a base section curved outward from the intermediate section so as to coincide in shape with the round portion of track member;
   wherein a width Wa between inside surfaces of bilateral intermediate sections of the engaging portions of the plate cover and a width Wb between the undercut portions of the track member are set such that the intermediate sections of the engaging portions tighten or clamp the track member in the width direction of the track member when the plate cover is fitted to the track member; and wherein a width Wc between the base sections of the engaging portions of the plate cover is set to be larger than a width Wd between outside surfaces of the roundup portions of the track member so as not to adversely affect on the clamping force of the plate cover to the track member.

8. A motion guide device comprising:

a track member having a horizontal surface and two side surfaces continuous to the horizontal surface;

a movable member mounted to the track member to be relatively movable with respect to the track member along a longitudinal direction thereof; and a cover member covering the horizontal surface of the track member along an entire width direction thereof, said track member being formed with undercut portions formed to side edge portions of the side surfaces of the track member, said undercut portions being recessed towards a central side of the track member in the width direction thereof; and said cover member comprising a central flat portion and engaging portions formed at both end portions in the width direction thereof to be engaged with the undercut portions, respectively, so as to clamp the track member therebetween in the width direction, each of said engaging portions comprising an intermediate section to be engaged with the undercut portion of the track member and a front end section bent outward from the intermediate section so as to be opened outward in the width direction of the track member;

wherein said cover member has a longitudinal dimension substantially equal to that of the track member;

wherein the horizontal surface and the side surfaces of said track member are continuous to each other through round portions and each of said engaging portions of the cover member further comprises a base section curved outward from the intermediate section so as to coincide in shape width the round portion of the track member;

wherein a width Wa between inside surfaces of bilateral intermediate sections of the engaging portions of the plate cover and a width Wb between the undercut portions of the track member are set such that the intermediate sections of the engaging portions tighten or clamp the track member in the width direction of the track member when the plate cover is fitted to the track member; and wherein a width Wc between the base sections of the engaging portions of the plate cover is set to be larger than a width Wd between outside surfaces of the round portions of the track member so as not to adversely affect on the clamping force of the plate cover to the track member.

* * * * *